(12) United States Patent
Miki (10) Patent No.: US 10,312,807 B2
(45) Date of Patent: Jun. 4, 2019

(54) POWER CONTROL APPARATUS, POWER SUPPLY SYSTEM, AND METHOD FOR CONTROLLING POWER SUPPLY SYSTEM

(71) Applicant: KYOCERA CORPORATION, Kyoto-shi, Kyoto (JP)

(72) Inventor: Tomohiro Miki, Yamato (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/531,172

(22) PCT Filed: Nov. 27, 2015

(86) PCT No.: PCT/JP2015/005916
§ 371 (c)(1),
(2) Date: May 26, 2017

(87) PCT Pub. No.: WO2016/084388
PCT Pub. Date: Jun. 2, 2016

(65) Prior Publication Data
US 2017/0331372 A1    Nov. 16, 2017

(30) Foreign Application Priority Data

Nov. 27, 2014 (JP) ................................ 2014-240600

(51) Int. Cl.
*H02M 3/157* (2006.01)
*H01M 10/46* (2006.01)
(Continued)

(52) U.S. Cl.
CPC ............ *H02M 3/157* (2013.01); *H01M 10/46* (2013.01); *H02J 3/32* (2013.01); *H02J 3/381* (2013.01);
(Continued)

(58) Field of Classification Search
CPC ...... H01M 10/06; H01M 10/44; H01M 10/46; H02J 7/00; H02J 9/00; H01J 5/00
(Continued)

(56) References Cited

U.S. PATENT DOCUMENTS 8,035,251 B2 * 10/2011 Lai .......................... H02J 9/062
307/46
8,493,020 B2 * 7/2013 Lee ...................... H01M 10/465
307/66
(Continued)

FOREIGN PATENT DOCUMENTS

JP        2001-8383 A     1/2001
JP   2011-200096 A    10/2011
(Continued)

OTHER PUBLICATIONS

International Search Report dated Feb. 16, 2016, issued by Japan Patent Office for International Application No. PCT/JP2015/005916.
(Continued)

*Primary Examiner* — Fritz M Fleming
*Assistant Examiner* — Jagdeep S Dhillon
(74) *Attorney, Agent, or Firm* — Procopio Cory Hargreaves and Savitch LLP (57) ABSTRACT

Provided are a power control apparatus, a power supply system, and a method for controlling a power supply system that can reduce the power loss when charging a storage battery from a power generation apparatus. A power control apparatus (power conditioner) controls connection between a storage battery and a power generation apparatus and includes a controller capable of selecting between a first electrical path in which the storage battery is connected to an inverter via a first power converter and the power generation apparatus is connected to the inverter via a second power
(Continued)

converter, and a second electrical path in which the power generation apparatus is connected to the inverter via the second power converter and the storage battery is connected to an intermediate point between the power generation apparatus and the second power converter via the first power converter. When surplus power is generated from the power generation apparatus, the controller selects the second electrical path and charges the storage battery with the surplus power.

11 Claims, 5 Drawing Sheets

(51) Int. Cl.
    *H02M 1/00*    (2006.01)
    *H02J 3/32*    (2006.01)
    *H02J 3/38*    (2006.01)
    *H02J 7/34*    (2006.01)
    *H02J 9/06*    (2006.01)
    *H02J 1/00*    (2006.01)
(52) U.S. Cl.
    CPC ............... *H02J 3/387* (2013.01); *H02J 7/34* (2013.01); *H02J 9/066* (2013.01); *H02J 2001/004* (2013.01); *H02M 2001/0048* (2013.01); *Y02B 90/14* (2013.01)
(58) Field of Classification Search
    USPC ............ 307/82, 52, 66, 64, 24, 19; 713/340; 700/291, 295; 320/101, 109, 128
    See application file for complete search history.

(56) References Cited

U.S. PATENT DOCUMENTS

| 2003/0113595 | A1* | 6/2003 | Jungreis | H01M 8/0494 |
| | | | | 429/430 |
| 2004/0257041 | A1 | 12/2004 | Nagaoka | |
| 2011/0210694 | A1* | 9/2011 | Uehashi | H02J 3/32 |
| | | | | 320/101 |
| 2013/0264865 | A1* | 10/2013 | Sugeno | H02J 3/32 |
| | | | | 307/9.1 |
| 2014/0049053 | A1 | 2/2014 | Inoue | |
| 2015/0022150 | A1* | 1/2015 | Momcilovich | B60L 3/12 |
| | | | | 320/109 |
| 2015/0333524 | A1 | 11/2015 | Nishikawa et al. | |
| 2016/0043597 | A1 | 2/2016 | Kuwahara | |
| 2016/0211670 | A1* | 7/2016 | Nakayama | H02J 3/383 |

FOREIGN PATENT DOCUMENTS

| JP | 2014-204470 A | 10/2014 |
| WO | 2012/144473 A1 | 10/2012 |
| WO | 2013/079067 A1 | 6/2013 |
| WO | 2014/103352 A1 | 7/2014 |

OTHER PUBLICATIONS

Written Opinion of the International Searching Authority dated Feb. 16, 2016, issued by Japan Patent Office for International Application No. PCT/JP2015/005916.

* cited by examiner

POWER CONTROL APPARATUS, POWER SUPPLY SYSTEM, AND METHOD FOR CONTROLLING POWER SUPPLY SYSTEM

CROSS-REFERENCE TO RELATED APPLICATION

This application claims priority to and the benefit of Japanese Patent Application No. 2014-240600 filed Nov. 27, 2014, the entire contents of which are incorporated herein by reference.

TECHNICAL FIELD

The present disclosure relates to a power control apparatus, a power supply system, and a method for controlling a power supply system.

BACKGROUND

As a power conditioner in a power supply system provided with a power generation apparatus, such as a fuel cell, a power conditioner that allows interconnected operation, to connect to a commercial power grid (abbreviated below as grid) and output AC power, and independent operation, to output AC power with no relation to the grid, is known. A power supply system provided with a distributed power source other than a power generation apparatus, such as a storage battery, is also known.

Some such power conditioners have a distributed power source or the like connected thereto at an intermediate link that has a predetermined DC voltage. For example, WO2012/144473 (PTL 1) discloses a power supply system with a configuration that directly connects a gas power generation apparatus and a storage battery to an intermediate link.

CITATION LIST

Patent Literature
PTL 1: WO2012/144473

SUMMARY (Technical Problem)

In a power supply system such as the one in PTL 1, when charging a storage battery with power from a power generation apparatus, the voltage of the power from the power generation apparatus is first stepped up to the intermediate link voltage. Subsequently, the intermediate link voltage is stepped down to the charging voltage, and for example constant current charging and constant voltage charging are performed. Therefore, the power loss sometimes grows large.

It would thus be helpful to provide a power control apparatus, a power supply system, and a method for controlling a power supply system that can reduce the power loss when charging a storage battery from a power generation apparatus.

(Solution to Problem)

A power control apparatus according to one of the disclosed embodiments is a power control apparatus for controlling connection between a storage battery and a power generation apparatus, the power control apparatus including: a controller configured to select between a first electrical path in which the storage battery is connected to an inverter via a first power converter and the power generation apparatus is connected to the inverter via a second power converter, and a second electrical path in which the power generation apparatus is connected to the inverter via the second power converter and the storage battery is connected to an intermediate point between the power generation apparatus and the second power converter via the first power converter; such that when surplus power is generated from the power generation apparatus, the controller selects the second electrical path and charges the storage battery with the surplus power.

A power supply system according to one of the disclosed embodiments is a power supply system including a storage battery, a power generation apparatus, and a power control apparatus configured to control connection between the storage battery and the power generation apparatus; such that the power control apparatus includes a controller configured to select between a first electrical path in which the storage battery is connected to an inverter via a first power converter and the power generation apparatus is connected to the inverter via a second power converter, and a second electrical path in which the power generation apparatus is connected to the inverter via the second power converter and the storage battery is connected to the power generation apparatus and the second power converter via the first power converter; and when surplus power is generated from the power generation apparatus, the controller selects the second electrical path and charges the storage battery with the surplus power.

A method for controlling a power supply system according to one of the disclosed embodiments is a method for controlling a power supply system that includes a storage battery, a power generation apparatus, and a power control apparatus configured to control connection between the storage battery and the power generation apparatus, the power control apparatus being configured to select between a first electrical path in which the storage battery is connected to an inverter via a first power converter and the power generation apparatus is connected to the inverter via a second power converter, and a second electrical path in which the power generation apparatus is connected to the inverter via the second power converter and the storage battery is connected to the power generation apparatus and the second power converter via the first power converter, the method including: selecting the second electrical path when surplus power is generated from the power generation apparatus; and charging the storage battery with the surplus power.

(Advantageous Effect)

The power control apparatus, power supply system, and method for controlling a power supply system according to embodiments of the present disclosure can reduce the power loss when charging a storage battery from a power generation apparatus.

DETAILED DESCRIPTION

The disclosed embodiments are described below in detail with reference to the accompanying drawings.

EMBODIMENTS

First, a power supply system according to one of the disclosed embodiments is described. In addition to power supplied from the grid (commercial power grid), a power supply system according to this embodiment is provided with a distributed power source that supplies power that cannot be sold. Examples of distributed power sources that supply power that cannot be sold include a storage battery system that can charge and discharge power, a fuel cell system that includes a fuel cell such as a Solid Oxide Fuel Cell (SOFC), and a gas power generator system that generates power with gas fuel. This embodiment illustrates an example of providing a storage battery, which is a distributed power source that supplies power that cannot be sold, and a power generation apparatus, which is either a fuel cell or a gas power generator. The power supply system may be further provided with a distributed power source that supplies power that can be sold (for example, a solar cell).

(Configuration of Power Supply System)

Figure 1:
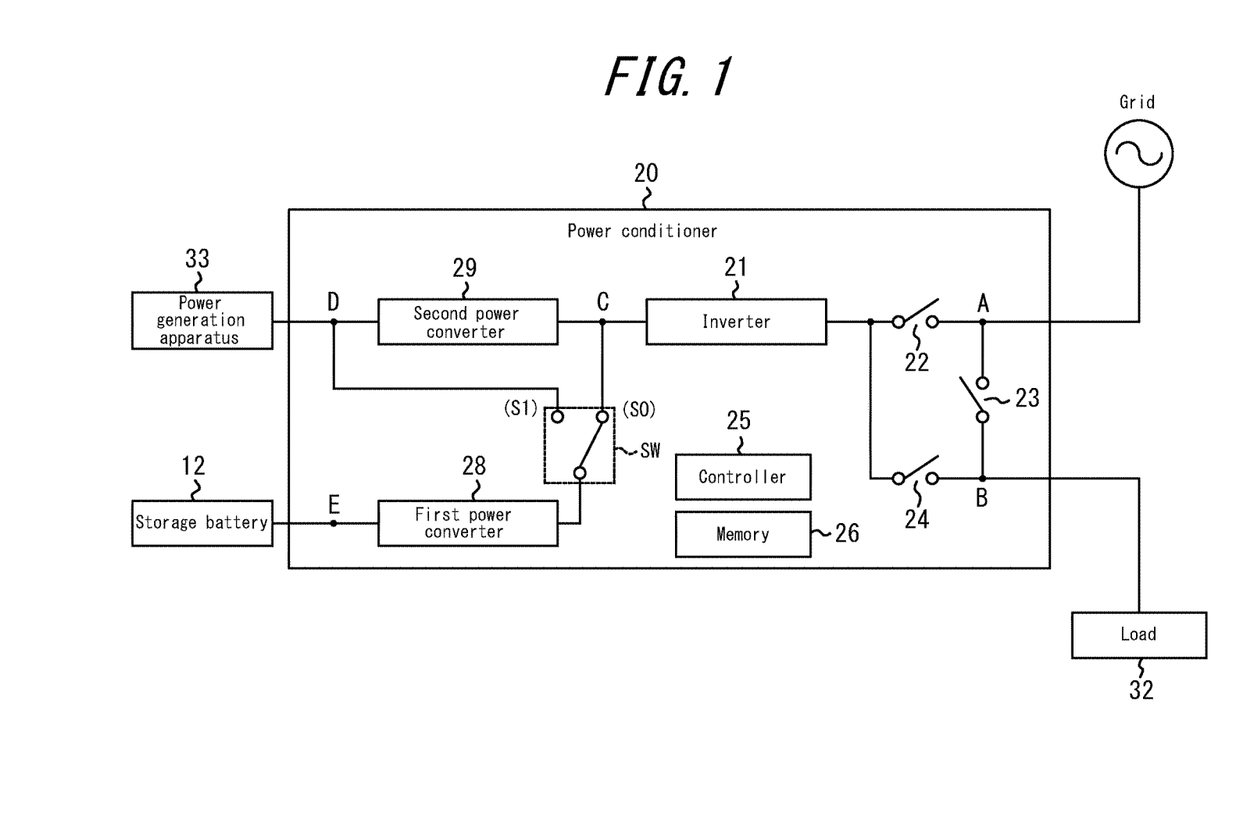
FIG. 1 is a block diagram of a power supply system according to one of the disclosed embodiments.

FIG. 1 is a block diagram schematically illustrating the structure of a power supply system according to one of the disclosed embodiments. The power supply system according to this embodiment is provided with a storage battery 12, a power conditioner 20 (a power control apparatus according to one of the disclosed embodiments), a load 32, and a power generation apparatus 33. Here, the power generation apparatus 33 is configured by a fuel cell or a gas power generator. The power supply system normally performs interconnected operation by interconnection with the grid and supplies the load 32 with power supplied from the grid and power from each distributed power source (storage battery 12, power generation apparatus 33). When there is no power supply from the grid, for example during a power outage, the power supply system performs independent operation and supplies the load 32 with power from each distributed power source.

In FIG. 1, the solid lines connecting functional blocks indicate wiring through which power flows, i.e. electrical paths. Even though control signals and communicated information flow between the controller 25 and many functional blocks, such flow is omitted from FIG. 1 for clarity of the drawing. The main control signals and the like are described below. Control signals and information may be communicated by wired communication or wireless communication. A variety of methods may be adopted for communication of control signals and information, including various layers. For example, communication by a short distance communication method such as ZigBee® (ZigBee is a registered trademark in Japan, other countries, or both) or the like may be used. A variety of transmission media, such as infrared communication, Power Line Communication (PLC), or the like, may also be used. A communication protocol that only prescribes the logical layers above the lower layers that include the physical layers suitable for various types of communication, such as ZigBee Smart Energy Profile 2.0 (SEP 2.0), ECHONET Lite® (ECHONET Lite is a registered trademark in Japan, other countries, or both), or the like may also be implemented.

The storage battery 12 is configured by a storage battery, such as a lithium ion battery or a nickel metal hydride battery. The storage battery 12 can provide power by discharging charged power. The storage battery 12 can charge with power supplied by the grid or the power generation apparatus 33. In this embodiment, the storage battery 12 charges on a priority basis with power supplied from the power generation apparatus 33, rather than power from the grid, not only during independent operation but also during interconnected operation.

The power conditioner 20 (power control apparatus) converts between DC power supplied from the storage battery 12 and the power generation apparatus 33 and AC power supplied from the grid, switches between interconnected operation and independent operation, and performs control of the connection between the storage battery 12 and the power generation apparatus 33. The power conditioner 20 includes an inverter 21, interconnected operation switches 22 and 23, an independent operation switch 24, a first power converter 28 (DC/DC converter), a second power converter 29 (DC/DC converter), an electrical path selection switch SW, a controller 25 that controls the power conditioner 20 overall, and a memory 26. The interconnected operation switch 23 may be configured to be outside of the power conditioner 20.

The first power converter 28 is a DC/DC converter that steps up or steps down the voltage of DC power. The first power converter 28 for example steps up the DC power from the storage battery 12 to a predetermined voltage. When the below-described second electrical path is selected by the power conditioner 20, the first power converter 28 steps down the DC voltage from the power generation apparatus 33 and supplies the result to the storage battery 12.

The second power converter 29 is a DC/DC converter that steps up the voltage of DC power. The second power converter 29 for example steps up the DC voltage from the power generation apparatus 33 to a constant voltage (for example, 330 V) necessary for the intermediate link and supplies the result to the inverter 21. The intermediate link is on the wiring connecting the second power converter 29 and the inverter 21 and corresponds to point C in FIG. 1.

The electrical path selection switch SW is a switch for selecting either the first electrical path or the second electrical path and may be configured by a combination of relays, transistors, and the like. As illustrated, the electrical path selection switch SW connects one end of the first power converter 28, the other end of which is connected to the storage battery 12, to the S0 side or the S1 side. When the electrical path selection switch SW is connected to the S0 side, the other end of the first power converter 28 is connected to the intermediate link (point C in FIG. 1). On the other hand, when the electrical path selection switch SW is connected to the S1 side, the other end of the first power converter 28 is connected to any point on the wiring that connects the power generation apparatus 33 and the second power converter 29, i.e. to an intermediate point between the power generation apparatus 33 and the second power converter 29 (point D in FIG. 1). That is, when the electrical path selection switch SW is connected to the S1 side, the other end of the first power converter 28 is connected to the power generation apparatus 33 and the second power converter 29. In this embodiment, the electrical path selection switch SW is normally connected to the S0 side, and connection to the S1 side is switched by the controller 25 in accordance with the below-described control method. When the electrical path selection switch SW is connected to the S1 side, the voltage of the DC power from the storage battery 12 is stepped up using both the first power converter 28 and the second power converter 29. Therefore, the generated heat can be dispersed.

The inverter 21 is a two-way inverter that converts DC power supplied from the power generation apparatus 33 and the storage battery 12 to AC power or converts AC power supplied from the grid to DC power.

The interconnected operation switches 22 and 23 and the independent operation switch 24 are configured by relays, transistors, or the like and are controlled to be on/off. The interconnected operation switches 22 and 23 and the independent operation switch 24 are synchronously switched so that both are not on (or off) simultaneously. In greater detail, when the interconnected operation switches 22 and 23 are turned on, the independent operation switch 24 is synchronously turned off, and when the interconnected operation switches 22 and 23 are turned off, the independent operation switch 24 is synchronously turned on. Synchronous control of the interconnected operation switches 22 and 23 and the independent operation switch 24 is implemented by hardware by branching the wiring of the control signal for the interconnected operation switches 22 and 23 to the independent operation switch 24. The on and off state with respect to the same control signal may of course be distinguished and set separately for each switch. Synchronous control of the interconnected operation switches 22 and 23 and the independent operation switch 24 may also be implemented by the controller 25 via software.

The controller 25 is, for example, configured by a microcomputer. Based on the state, such as an increase in the grid voltage or a power outage, or other such factors, the controller 25 controls operations of each component, such as the inverter 21, the interconnected operation switches 22 and 23, the independent operation switch 24, the first power converter 28, and the second power converter 29. During interconnected operation, the controller 25 turns the interconnected operation switches 22 and 23 on and turns the independent operation switch 24 off. During independent operation, the controller 25 turns the interconnected operation switches 22 and 23 off and turns the independent operation switch 24 on. The controller 25 switches the electrical path selection switch SW in accordance with factors such as the power necessary for the load 32, the power supplied by the power generation apparatus 33, and the voltage of the storage battery 12. By receiving values detected by detectors (power meters, voltage sensors, and the like) provided at points A, B, D and E in FIG. 1, the controller 25 can learn the state, such as an increase in the grid voltage or a power outage, the power of the load 32, the power supplied by the power generation apparatus 33, and the voltage of the storage battery 12. Here, point A is any point on the wiring that connects the grid and the interconnected operation switches 22 and 23. Point B is any point on the wiring that connects the load 32 and the independent operation switch 24. Point E is any point on the wiring that connects the storage battery 12 and the first power converter 28.

The memory 26 stores information necessary for processing by the power conditioner 20 and programs with a description of processing to implement the functions of the power conditioner 20.

The load 32 is a power load that consumes power. Examples include a variety of household electrical appliances such as an air conditioner, microwave oven, and television; machinery and lighting facilities, such as air conditioning equipment and lighting equipment, that are used in commercial and industrial facilities; and the like.

The power generation apparatus 33 is configured by a fuel cell or a gas power generator. The fuel cell is provided with a cell and with other auxiliary components. The cell generates DC power by chemically reacting hydrogen with oxygen in the air. The fuel cell serving as the power generation apparatus 33 may be a versatile system not necessary designed under the assumption of connecting to the power conditioner 20. The gas power generator generates power with a gas engine that uses a predetermined gas or the like as fuel. The power generation apparatus 33 may generate power for example while a current sensor is detecting forward power flow (current in the direction of buying power).

While generating power, the power generation apparatus 33 can perform a load following operation to follow the power consumption of the load 32 or a rated operation at a predetermined rated power. The range of following during the load following operation may, for example, be 200 W to 700 W, and the rated power during the rated operation may, for example, be 700 W.

In this embodiment, the controller 25 can select between a first electrical path and a second electrical path. In the first electrical path, the storage battery 12 is connected to the inverter 21 via the first power converter 28, and the power generation apparatus 33 is connected to the inverter 21 via the second power converter 29. In the second electrical path, the power generation apparatus 33 is connected to the inverter 21 via the second power converter 29, and the storage battery 12 is connected to an intermediate point between the power generation apparatus 33 and the second power converter 29 via the first power converter 28. In greater detail, the controller 25 selects the first electrical path by connecting the electrical path selection switch SW to the S0 side and selects the second electrical path by connecting the electrical path selection switch SW to the S1 side. In the power supply system of this embodiment, when the second electrical path is selected, the storage battery 12 can charge highly effectively with power supplied from the power generation apparatus 33. The following provides a detailed description of control to switch from the first electrical path to the second electrical path in the power supply system of this embodiment, first describing control during interconnected operation and then control during independent operation.

(Control During Interconnected Operation)

Figure 2:
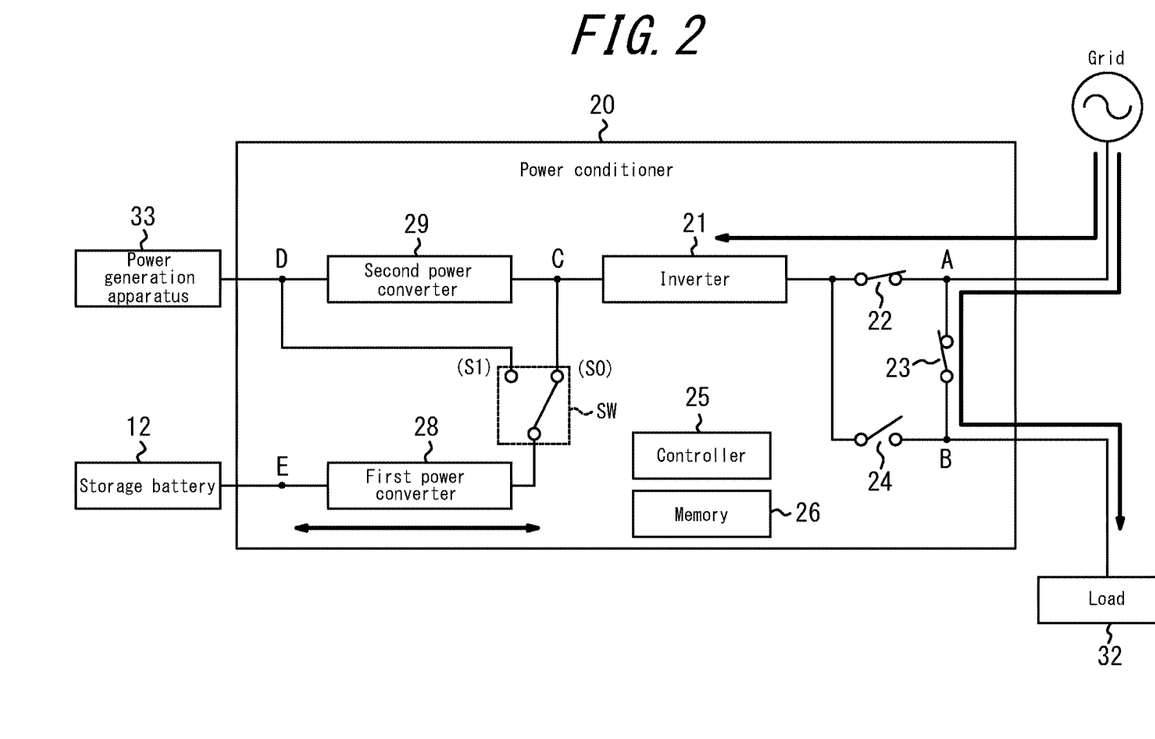
FIG. 2 illustrates the power supply system during interconnected operation.

FIG. 2 illustrates an example of control in the power supply system during interconnected operation. The power conditioner 20 turns the interconnected operation switches 22 and 23 on and the independent operation switch 24 off.

During interconnected operation, AC 100 V (or 200 V) power is supplied by the grid, as illustrated by the bold arrows, and is fed to the load 32. When charging of the storage battery 12 is not complete, the power conditioner 20 can convert the AC power from the grid to DC power and charge the storage battery 12 with this DC power. In this embodiment, when the power generation apparatus 33 is generating power, the power conditioner 20 uses power from the power generation apparatus 33 to charge the storage battery 12 in order to increase the charging efficiency, as described below. Therefore, in this embodiment, power from the grid is used to charge the storage battery 12 for example when the power generation apparatus 33 is not generating power.

In the power supply system of this embodiment, when the power generation apparatus 33 is not generating power, the electrical path is not switched from the first electrical path to the second electrical path (in other words, the connection of the electrical path selection switch SW is not switched from the S0 side to the S1 side). The power supply system is described below assuming that the power generation apparatus 33 is generating power and is performing a rated operation.

The power conditioner 20 supplies the power generated by the power generation apparatus 33 to the load 32. When surplus power is generated by the power generation apparatus 33, the power conditioner 20 supplies the surplus power to the storage battery 12 via the second electrical path (charging of storage battery 12). In this embodiment, surplus power refers to power that is not consumed by the load 32 among the generated power during the rated operation of the power generation apparatus 33. A comparison of the first electrical path and the second electrical path shows that in the second electrical path, the first power converter 28 is connected to the output portion of the power generation apparatus 33 (point D in FIG. 2), not to the intermediate link (point C in FIG. 2). Therefore, the first power converter 28 steps down the voltage of the output portion of the power generation apparatus 33, which is lower than the voltage of the intermediate link (intermediate link voltage), and charges the storage battery 12 with the stepped-down power, thereby reducing the power loss in the first power converter 28. Also, by using the second electrical path, the second power converter 29 does not need to step up voltage to the intermediate link voltage, thereby eliminating power loss in the second power converter 29. In other words, by charging the storage battery 12 with surplus power via the second electrical path, the power loss in the first power converter 28 and second power converter 29 can be reduced. As a result, the storage battery 12 can be charged with high efficiency.

The power conditioner 20 can also supply power from the storage battery 12 to the load 32 (discharging of storage battery 12). In this embodiment, by appropriately switching between the first electrical path and the second electrical path in accordance with the voltage of the storage battery 12, the power conditioner 20 disperses heat to prevent heat from concentrating in a particular section. The difference between when the DC voltage of the storage battery 12 (which, for example, is a lithium ion battery) is at high voltage and at low voltage is several dozen volts. Therefore, the amount by which the voltage is stepped up in the first power converter 28 is greater at low voltage than at high voltage, and a large amount of heat is generated. In this embodiment, the power conditioner 20 is provided with a threshold for the voltage of the storage battery 12 (for example, a voltage that is 10 V lower than the voltage during high voltage). When the voltage of the storage battery 12 falls below this threshold, the power conditioner 20 selects the second electrical path and discharges the storage battery 12. In the second electrical path, the output voltage of the storage battery 12 is stepped up in two stages, by the first power converter 28 and the second power converter 29. Therefore, the heat generated by stepping up voltage is distributed between the first power converter 28 and the second power converter 29, preventing heat from concentrating in a particular section and increasing the reliability of the power supply system.

(Control During Independent Operation)

Figure 3:
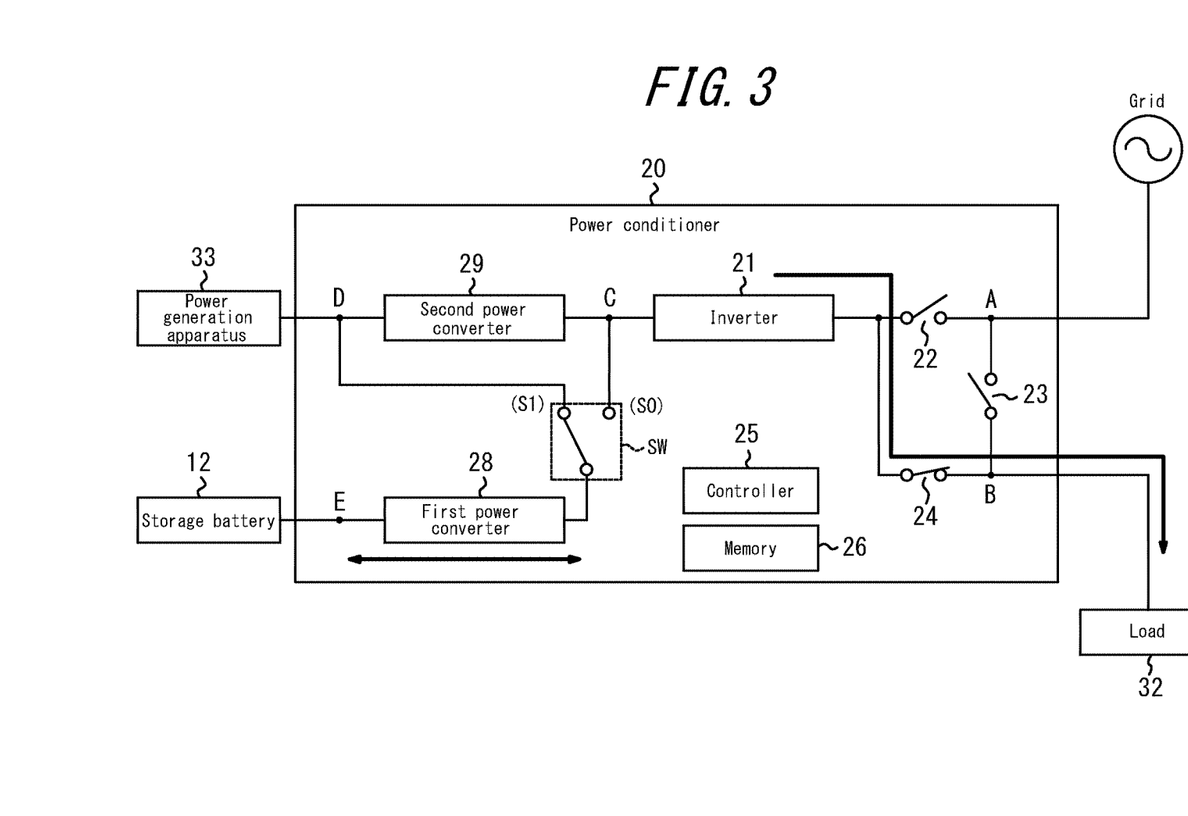
FIG. 3 illustrates the power supply system during independent operation.

FIG. 3 illustrates an example of control in the power supply system during independent operation. The power conditioner 20 turns the interconnected operation switches 22 and 23 off and the independent operation switch 24 on.

Unlike in FIG. 2 (during interconnected operation), power from the grid is not supplied to the load 32 during independent operation. In other words, the power consumed by the load 32 needs to be covered by the power that the power generation apparatus 33 generates and the power that the storage battery 12 discharges, as indicated by the bold arrow. Therefore, as compared to interconnected operation, the surplus power of the power generation apparatus 33 may be reduced. Other than this reduction in surplus power, however, the presence or absence of power from the grid has no effect. Hence, with regard to switching between the first electrical path and the second electrical path, the power conditioner 20 can execute the same control as during interconnected operation. In other words, during independent operation as well, the power conditioner 20 can reduce power loss during charging of the storage battery 12 and disperse heat during discharging of the storage battery 12 by appropriately switching between the first electrical path and the second electrical path.

Figure 4:
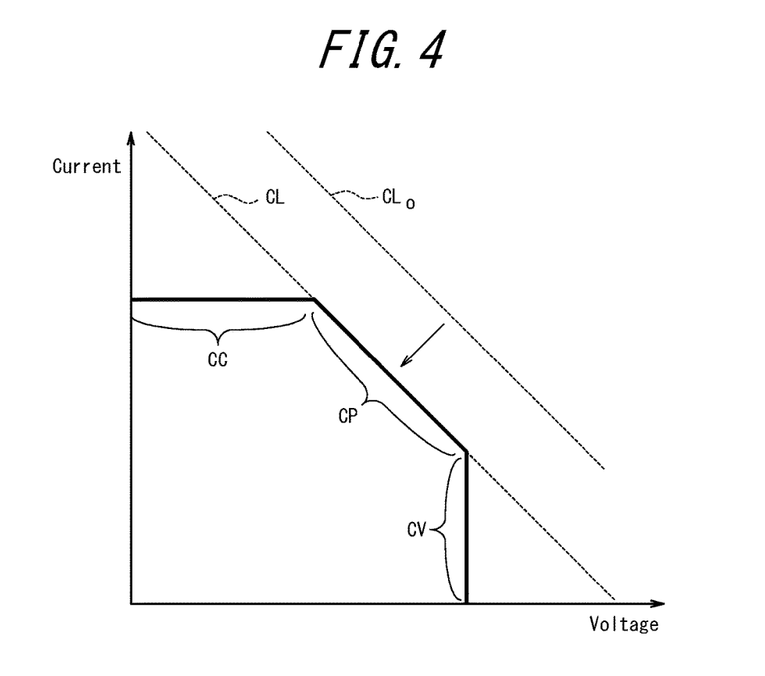
FIG. 4 illustrates charging from a power generation apparatus to a storage battery.

With reference to FIG. 4, the relationship between the surplus power of the power generation apparatus 33 and charging of the storage battery 12 is described. The horizontal axis in FIG. 4 represents the voltage of the storage battery 12, and the vertical axis in FIG. 4 represents the current of the storage battery 12. In this embodiment, the storage battery 12 (which, for example, is a lithium ion battery) generally charges by a Constant Voltage Constant Current (CVCC) method. The CVCC method performs constant current charging in a state in which the voltage of the storage battery 12 is low, and when the voltage of the storage battery 12 reaches a preset voltage, this method switches to constant voltage charging, in which the current is controlled to maintain constant voltage. The bold line in FIG. 4 is a charging curve of the storage battery 12. In the charging curve, the CC interval indicates constant current charging, and the CV interval indicates constant voltage charging.

The dotted line CL in FIG. 4 represents surplus power of the power generation apparatus 33. The dotted line $CL_0$ to the upper right in FIG. 4 represents generated power of the power generation apparatus 33 (when not taking into consideration the supply to the load 32 and intentional adjustment of the generated power). CL and $CL_0$ in FIG. 4 exhibit the characteristic of current decreasing as voltage increases and current increasing as voltage decreases. The power generation apparatus 33 generates power in accordance with $CL_0$, but power partially decreases, for example due to supply to the load 32. Therefore, the surplus power that can charge the storage battery 12 becomes the power indicated by CL in FIG. 4 (see the arrow in FIG. 4). Since the storage battery 12 is charged by surplus power, the charging current and charging voltage can only vary within the range delimited by CL, the vertical axis, and the horizontal axis of FIG. 4. In other words, the charging power yielded by multiplying the charging current by the charging voltage cannot exceed CL (surplus power) in FIG. 4. Accordingly, as illustrated in FIG. 4, a CP interval (interval in which power is constant, i.e. a constant power interval) in the charging curve is generated. In this embodiment, the power conditioner 20 does not simply switch between constant current charging and constant voltage charging, but rather appropriately needs to learn the surplus power of the power generation apparatus 33 and change the charging current and the charging voltage in the CP interval.

During independent operation, the surplus power might become smaller than it is during interconnected operation. Therefore, the CP interval might grow larger. In other words, during independent operation, the range of values for the charging current and the charging voltage may become narrow, and the CC interval and CV interval may become shorter than they are during interconnected operation. As described above, however, control to switch from the first electrical path to the second electrical path is the same as during interconnected operation.

From another perspective, the existence of the CP interval yields the effect of making it difficult for the CC interval to grow longer. In other words, rapid charging is prevented. Therefore, although the charging time of the storage battery 12 increases, the controller 25 may intentionally lengthen the CP interval in order to extend the life of the storage battery 12. For example, the controller 25 may extend the life of the storage battery 12 by intentionally adjusting the power generation to decrease the surplus power, so as to lengthen the CP interval intentionally.

(Method for Controlling a Power Supply System)

Figure 5A:
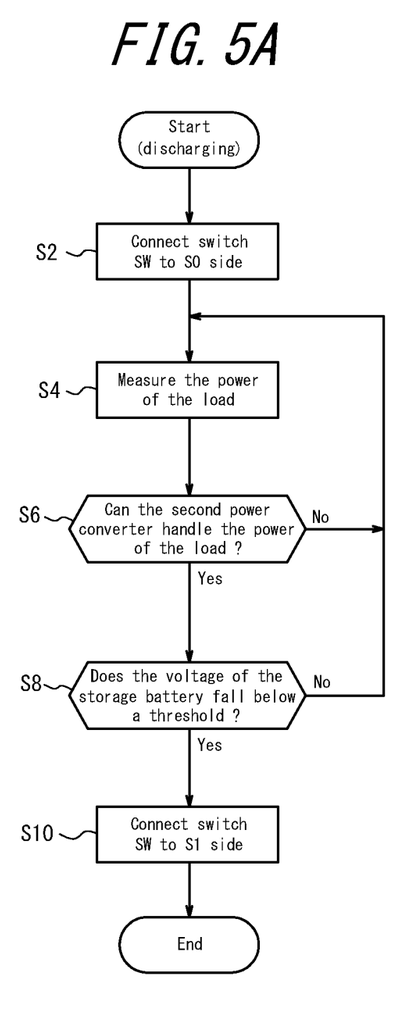
FIGS. 5A and 5B are flowcharts illustrating a method for controlling a power supply system.
Figure 5B:
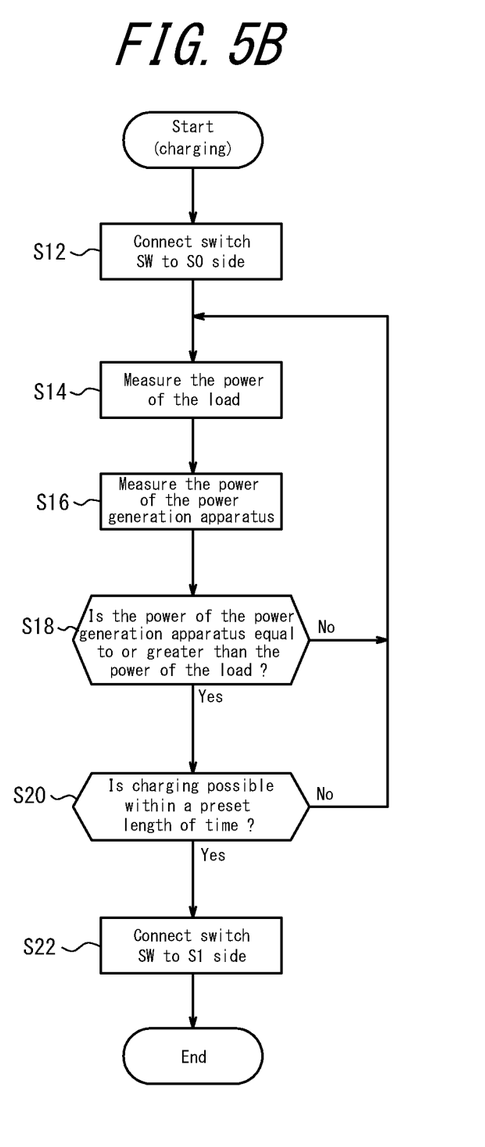

FIGS. 5A and 5B are flowcharts illustrating a method for controlling a power supply system respectively during discharging and charging of the storage battery 12. The following describes discharging and charging of the storage battery 12 in this order.

(Discharging)

With reference to FIG. 5A, the following describes a method for controlling a power supply system during discharging. The controller 25 selects the first electrical path by connecting the electrical path selection switch SW to the S0 side (step S2). The controller 25 then measures the power required by the load 32 (step S4). The controller 25 can learn the power of the load 32 by, for example, receiving the value detected by the detector provided at point B in FIG. 1.

The controller 25 determines whether the second power converter 29 can handle the power of the load 32 (step S6). When the second electrical path is selected, the second power converter 29 receives output voltage not only from the power generation apparatus 33 but also from the first power converter 28 and needs to step up the output voltage to supply the result to the load 32. Therefore, the controller 25 confirms that the power of the load 32 for example does not exceed the maximum rated power of the second power converter 29. When determining that the second power converter 29 cannot handle the power of the load 32 (step S6: No), the controller 25 returns to the processing in step S4. Conversely, when determining that the second power converter 29 can handle the power of the load 32 (step S6: Yes), the controller 25 proceeds to the processing in step S8.

The controller 25 determines whether the voltage of the storage battery 12 falls below a threshold (step S8). The controller 25 can learn the voltage of the storage battery 12 by, for example, receiving the value detected by the voltage sensor provided at point E in FIG. 1. When the voltage of the storage battery 12 does not fall below the threshold (step S8: No), there is no need to disperse heat generated by voltage step-up in the first power converter 28. Therefore, the controller 25 maintains selection of the first electrical path and returns to the processing in step S4. Conversely, when the voltage of the storage battery 12 falls below the threshold (step S8: Yes), the controller 25 selects the second electrical path by connecting the electrical path selection switch SW to the S1 side (step S10).

Note that the controller 25 performs control so that the output voltage from the first power converter 28 when selecting the first electrical path (corresponding to the first output voltage of the present disclosure) and the output voltage from the first power converter 28 when selecting the second electrical path (corresponding to the second output voltage of the present disclosure) differ. In other words, in this embodiment, the controller 25 needs to change the voltage step-up ratio of the first power converter 28 according to the selected path. In particular, when selecting the second electrical path, the controller 25 controls the voltage step-up ratio of the first power converter so that the output voltage from the power generation apparatus 33 (the third output voltage of the present disclosure) and the output voltage from the first power converter 28 match.

(Charging)

With reference to FIG. 5B, the following describes a method for controlling a power supply system during charging. The controller 25 connects the electrical path selection switch SW to the S0 side (step S12). The controller 25 then measures the power required by the load 32 (step S14).

Subsequently, the controller 25 measures the power generated by the power generation apparatus 33 (step S16). The controller 25 can learn the power of the power generation apparatus 33 by, for example, receiving the value detected by the detector provided at point D in FIG. 1.

The controller 25 determines whether the power of the power generation apparatus 33 is equal to or greater than the power of the load 32 (step S18). When the power of the power generation apparatus 33 is not equal to or greater than the power of the load 32 (step S18: No), i.e. when there is no surplus power, the controller 25 cannot charge the storage battery 12 with the power of the power generation apparatus 33 and therefore returns to the processing in step S14. Conversely, when the power of the power generation apparatus 33 is equal to or greater than the power of the load 32 (step S18: Yes), i.e. when there is surplus power, the controller 25 proceeds to step S20.

When surplus power is generated from the power generation apparatus 33, the controller 25 determines whether the storage battery 12 can be charged within a realistic, preset length of time (for example, several hours) (step S20). At this time, the controller 25 may determine the charging curve of the storage battery 12 illustrated in FIG. 4 by computation to calculate the expected time taken to charge. For example, the controller 25 updates CL in FIG. 4 in association with the surplus power obtained in step S18 and calculates the CP interval of the charging curve. During the CP interval, the charging current decreases as compared to the CC interval, which lengthens the charging time. Therefore, the case of the CP interval being zero (the case of rapid charging that transitions from the CC interval to the CV interval without passing through the CP interval) may be taken as a standard, and the expected time taken to charge can be calculated by adding the charging time delay in accordance with the calculated CP interval. When charging within the preset length of time is not possible (step S20: No), the controller 25 returns to the processing in step S14. Conversely, when charging within the preset length of time is possible (step S20: Yes), the controller 25 selects the second electrical path by connecting the electrical path selection switch SW to the S1 side (step S22). By the second electrical path being selected, power loss in the first power converter 28 and the second power converter 29 is reduced when charging the storage battery 12 with surplus power. As a result, the storage battery 12 can be charged with high efficiency.

In this way, according to the power control apparatus and power supply system of this embodiment, appropriately switching the first electrical path to the second electrical path allows the power loss to be reduced when charging the storage battery 12 from the power generation apparatus 33 and allows heat to be dispersed when discharging the storage battery 12.

Although exemplary embodiments have been described with reference to the accompanying drawings, it is to be noted that various changes and modifications will be apparent to those skilled in the art based on the present disclosure. Therefore, such changes and modifications are to be understood as included within the scope of the present disclosure. For example, the functions and the like included in the various members, units, and steps may be reordered in any logically consistent way. Furthermore, units or steps may be combined into one or divided.

For example, in the method for controlling a power supply system of this embodiment, when charging is not possible within a preset length of time (step S20: No), processing returns to step S14 and waits for a decrease in the power of the load, but the processing sequence may instead be terminated.

The control of the present disclosure is described as a series of operations executed by a computer system and other hardware that can execute program instructions. Examples of the computer system and other hardware include a general-purpose computer, a Personal Computer (PC), a dedicated computer, a workstation, and other programmable data processing apparatuses. It should be noted that in each embodiment, various operations are executed by a dedicated circuit (for example, individual logical gates interconnected in order to execute a particular function) implemented by program instructions (software), or by a logical block, program module, or the like executed by one or more processors. The one or more processors that execute a logical block, program module, or the like are, for example, one or more of each of the following: a microprocessor, a Central Processing Unit (CPU), an Application Specific Integrated Circuit (ASIC), a Digital Signal Processor (DSP), a Programmable Logic Device (PLD), a Field Programmable Gate Array (FPGA), a controller, a microcontroller, an electronic device, another apparatus designed to be capable of executing the functions disclosed herein, and/or a combination of any of the above. The embodiments disclosed herein are, for example, implemented by hardware, software, firmware, middleware, microcode, or a combination of any of these.

REFERENCE SIGNS LIST

12 Storage battery
20 Power conditioner (power control apparatus)
21 Inverter
22, 23 Interconnected operation switch
24 Independent operation switch
25 Controller
26 Memory
28 First power converter (DC/DC converter)
29 Second power converter (DC/DC converter)
32 Load
33 Power generation apparatus (fuel cell or gas power generator)

The invention claimed is:

1. A power control apparatus for controlling connection between a storage battery and a power generation apparatus generating DC power, the power control apparatus comprising:
an inverter;
a first power converter between a storage battery and the inverter;
a second power converter between a power generation apparatus and the inverter;
a switch on a side of the first power converter that is opposite the storage battery, wherein the switch is configured to switch between
a first electrical path which connects to a first side of the second power converter between the second power converter and the inverter, such that the power generation apparatus is connected to the storage battery via both the first power converter and the second power converter, and
a second electrical path which connects to a second side of the second power converter between the power generation apparatus and the second power converter, such that the power generation apparatus is connected to the storage battery via the first power converter but not the second power converter; and
a controller configured to, when surplus power is generated from the power generation apparatus, control the switch to select the second electrical path and charge the storage battery with the surplus power.

2. The power control apparatus of claim 1, wherein the controller discharges the storage battery by controlling the switch to select the first electrical path when voltage of the storage battery is equal to or greater than a threshold and select the second electrical path when voltage of the storage battery falls below the threshold.

3. The power control apparatus of claim 2, wherein the controller performs control so that a first output voltage from the first power converter when selecting the first electrical path and a second output voltage from the first power converter when selecting the second electrical path differ.

4. The power control apparatus of claim 3, wherein when selecting the second electrical path, the controller controls a step-up ratio of the first power converter so that a third output voltage from the power generation apparatus and the second output voltage match.

5. The power control apparatus of claim 1, wherein the controller calculates an expected time taken to charge the storage battery based on an interval of constant power of the storage battery and charges the storage battery with the surplus power when the expected time is within a preset length of time.

6. The power control apparatus of claim 1, further comprising the storage battery, and the power generation apparatus, wherein the power generation apparatus generating DC power.

7. The power supply system of claim 6, wherein the controller calculates an expected time taken to charge the storage battery based on an interval of constant power of the storage battery and charges the storage battery with the surplus power when the expected time is within a preset length of time.

8. A power supply system comprising a storage battery, a power generation apparatus generating DC power, and a power control apparatus configured to control connection between the storage battery and the power generation apparatus;
wherein the power control apparatus comprises a controller configured to select between
a first electrical path in which the storage battery is connected to an inverter via a first power converter and the power generation apparatus is connected to the inverter via a second power converter, and
a second electrical path in which the power generation apparatus is connected to the inverter via the second power converter and the storage battery is connected to an intermediate point between the power generation apparatus and the second power converter via the first power converter; and when surplus power is generated from the power generation apparatus, the controller selects the second electrical path and charges the storage battery with the surplus power,
wherein the controller lengthens an interval of constant power of the storage battery by adjusting generated power of the power generation apparatus to reduce the surplus power.

9. A method for controlling a power supply system, the power supply system comprising a storage battery, a power generation apparatus generating DC power, an inverter, a first power converter between the storage battery and the inverter, a second power converter between the power generation apparatus and the inverter, a switch on a side of the first power converter that is opposite the storage battery, wherein the switch is configured to switch between a first electrical path which connects to a first side of the second power converter between the second power converter and the inverter, such that the power generation apparatus is connected to the storage battery via both the first power converter and the second power converter, and a second electrical path which connects to a second side of the second power converter between the power generation apparatus and the second power converter, such that the power generation apparatus is connected to the storage battery via the first power converter but not the second power converter, the method comprising, by a controller, when surplus power is generated from the power generation apparatus:
controlling the switch to select the second electrical path; and
charging the storage battery with the surplus power.

10. The method for controlling a power supply system of claim 9, further comprising:

calculating an expected time taken to charge the storage battery based on an interval of constant power of the storage battery;
wherein in the charging, the storage battery is charged with the surplus power when the expected time is within a preset length of time.

11. A method for controlling a power supply system, the power supply system comprising a storage battery, a power generation apparatus generating DC power, and a power control apparatus configured to control connection between the storage battery and the power generation apparatus,
the power control apparatus being configured to select between a first electrical path in which the storage battery is connected to an inverter via a first power converter and the power generation apparatus is connected to the inverter via a second power converter, and a second electrical path in which the power generation apparatus is connected to the inverter via the second power converter and the storage battery is connected to an intermediate point between the power generation apparatus and the second power converter via the first power converter,
the method comprising:
selecting the second electrical path when surplus power is generated from the power generation apparatus;
charging the storage battery with the surplus power; and
lengthening an interval of constant power of the storage battery by adjusting generated power of the power generation apparatus to reduce the surplus power.

* * * * *